June 16, 1931.  H. A. E. DRESCHER ET AL  1,810,758
PROCESS FOR THE MANUFACTURE OF DERIVATIVES OF VAT DYESTUFFS Filed March 3, 1927

H. A. E. Drescher
J. E. G. Harris
B. Wylam
and
J. Thomas
INVENTORS

By: Marks & Clerk
Attys.

Patented June 16, 1931

1,810,758

UNITED STATES PATENT OFFICE

HUGH ALBERT EDWARD DRESCHER, JOHN EDMUND GUY HARRIS, BIRKETT WYLAM, AND JOHN THOMAS, OF GRANGEMOUTH, SCOTLAND, ASSIGNORS TO SCOTTISH DYES, LIMITED, OF GRANGEMOUTH, SCOTLAND

PROCESS FOR THE MANUFACTURE OF DERIVATIVES OF VAT DYESTUFFS

Application filed March 3, 1927, Serial No. 172,550, and in Great Britain March 15, 1926.

This invention relates to the manufacture and use of dyestuff derivatives prepared from vat dyestuffs.

In British specification No. 247,787, filed August 11th, 1924, there is described the preparation of derivatives of vat dyestuffs by interaction of the vat dyestuffs with a metal and chloro-sulphonic acid or the like in the presence of a tertiary amine and analogous matters.

The object of the present invention is to provide improved or further methods for preparing derivatives of vat dyestuffs, which derivatives possess the property of being capable of employment for dyeing without the usual vat process.

The invention consists in a process for the manufacture of derivatives of vat dyestuffs comprising the reaction between a quaternary ammonium halide which may be obtained by reaction between a tertiary organic base and an alkyl halide, in tertiary organic basic suspension with a metal, a vat dyestuff and a product obtained by the interaction of a tertiary organic base with a reagent adapted to yield the sulphuric anhydride compound of the tertiary base for example an alkyl chlor sulphonate, sulphuric acid mono-chloride (chlor-sulphonic acid) oleum, or sulphur trioxide.

The invention also consists in a process for the manufacture of derivatives of vat dyestuffs according to which a quaternary ammonium halide which may be obtained by reaction between a tertiary organic base and an alkyl halide is caused to react in tertiary organic basic suspension with a metal and the resulting mixture to react with a vat dyestuff, the product then being subjected to the reaction of a compound of a tertiary organic base formed by the addition of a reagent adapted to yield the sulphuric anhydride compound of the tertiary base for example an alkyl chlor sulphonate, sulphuric acid-mono chloride (chlor sulphonic acid), oleum, or sulphur trioxide to pyridine or other tertiary organic base.

The invention also consists in methods for preparing vat dyestuffs derivatives substantially as herein described.

The invention also consists in the application of the products of the processes indicated above to dyeing and printing.

The invention includes vat dyestuff derivatives which can be prepared by the processes described or by their obvious chemical equivalents.

The invention also consists in dyed and printed products which can be prepared by processes substantially as herein described or by their obvious chemical equivalents.

Referring to the accompanying diagrammatic drawings, which give probable constitutional formulæ of the bodies to which they refer, but do not take into account water of crystallization, associated with the compound, which may vary according to the methods used during crystallization and drying:—

The following examples illustrate how the invention may be carried into effect, all parts being parts by weight and references to temperature being to degrees centigrade.

Example 1

This is an example illustrating the employment of indigo, methyl pyridinium iodide, zinc and pyridine followed by treatment with the product of pyridine and methyl chlor-sulphonate.

5 parts of methyl pyridinium iodide (prepared for example by adding 3.25 parts of methyl iodide to 1.8 parts of pyridine) are suspended in pyridine in a vessel and with good stirring 1.5 parts of finely divided zinc are added. To this mixture there are then added 1.5 parts of dry indigo and the mixture efficiently stirred.

Enough pyridine is employed to give a thick but workable paste, the pyridine thus employed being in excess of the theoretical quantity required.

To the suspension there are added 4.8 parts of the additive compound formed by the addition of pyridine to methyl chlor-sulphonate. The contents are well stirred and heated to 30 to 40° C. for a short time. The melt is then worked up in the usual way. For example, it can be made alkaline with soda ash solution and excess of pyridine distilled off in steam. The residue in the still is then extracted with boiling water and the filtrate concentrated and cooled.

The product can be employed for dyeing and printing; for example fabrics, for instance, can be padded in the water solution of the product and the dye formed on the fibre by the addition of an acid oxidizing agent.

In connection with this process the following gives our present view of the reaction in the case of indigo: —

The zinc reacts with the methyl pyridinium iodide. On addition of the indigo a reaction takes place and the melt becomes red due apparently to the formation of a red compound of the dyestuff which if exposed to moist air is transformed into a yellow derivative of the dyestuff.

Figure 1:
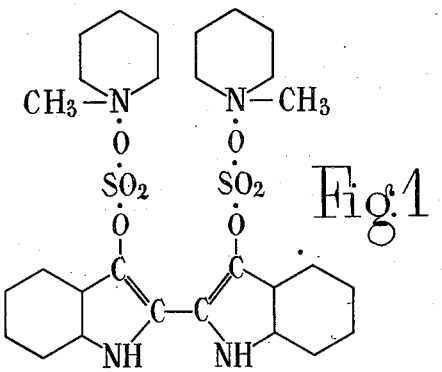
Figure 1 represents the derivative obtained in the case of indigo and referred to more particularly in Example 1.

The final product after addition of the product from pyridine and methyl chlor-sulphonate to the suspension of the red substance and working up is closely related in properties to the methyl pyridinium salt of the disulphuric acid ester of leuco indigo which appears to have the formula indicated in Fig. 1.

*Example 2*

This deals with dimethoxy-dibenzanthrone, methyl chloride, zinc and pyridine followed by treatment with pyridine sulphur trioxide.

4 parts of dimethoxy-dibenzanthrone and 3 parts of zinc are suspended in 28.5 parts of pyridine containing 4.3 parts of methyl chloride in an atmosphere of nitrogen. The temperature of the mixture is slowly raised to 75° at about which temperature the melt becomes a deep blue and thickens considerably. The melt is stirred for 5–10 minutes and then cooled to 20° at which temperature 8 parts of pyridine sulphur trioxide are added. The melt immediately becomes a bright crimson. The temperature is then raised to 55° during about 20 minutes and kept at 55° for half an hour, after which time it is cooled, mixed with about 250 parts of a 5% sodium carbonate solution and steam distilled. When apparently all the pyridine has been removed, the liquid is filtered hot and the stable soluble derivative precipitated as a red solid from the filtrates by addition of common salt.

Figure 2:
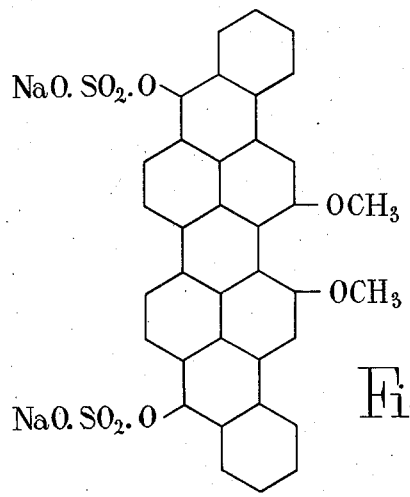
Figure 2 illustrates the case of dimethoxy-dibenzanthrone, the end product being a sodium salt, and referred to more particularly in Example 2.

The red solid appears to consist mainly of the sodium salt of a disulphuric acid ester of dihydro-dimethoxy-dibenzanthrone and to have a formula as indicated in Figure 2, associated with water of crystallization.

*Example 3*

This deals with thio-indigo, ethyl bromide, zinc and pyridine followed by treatment with pyridine sulphur trioxide.

A well stirred mixture of 50 parts of pyridine, 11 parts of thio-indigo and 8 parts of zinc dust is heated to 70° in an atmosphere of nitrogen. 0.75 part of ethyl bromide is then added. The temperature is maintained at 70° for 20 minutes when the melt changes to blood red, then to green and then to greenish yellow. It is cooled to 20° and 20 parts of pyridine sulphur trioxide added. The temperature is then raised to 50° during half an hour and kept at 50° for half an hour. The final colour of the melt is a greyish white. The melt is then mixed with about 400 parts of water containing 30 parts of sodium carbonate and steam distilled. After apparent removal of the pyridine, the extract is filtered and the thio-indigo derivative allowed to crystallize out. The product remaining in the mother liquor may be substantially separated, either by concentration in vacuo and subsequent crystallization or by salting out with common salt.

Figure 3:
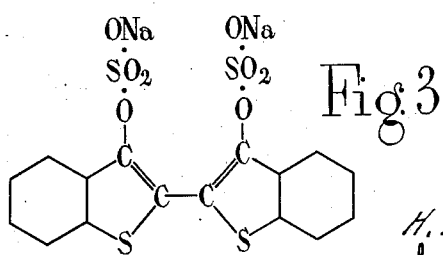
Figure 3 represents the case of thio-indigo, the end product being a sodium salt and referred to more particularly in Example 3.

The product appears to be the sodium salt of the disulphuric acid ester of dihydro-thioindigo and to have the formula indicated in Figure 3, associated with water of crystallization.

*Example 4*

This deals with thio-indigo, methyl chloride, zinc and pyridine followed by treatment with dimethyl-aniline sulphur trioxide.

6 parts of thio-indigo, 2 parts of zinc and 30 parts of pyridine containing 1.4 parts of methyl chloride are heated to 60° for 10 minutes. The green brown melt is then cooled to 20° at which temperature 12 parts of di-methyl-aniline-sulphur trioxide are added. The temperature is raised to 50° and kept at 50° for half an hour. The melt is then worked up with sodium carbonate as described in Example 3.

*Example 5*

This deals with dimethoxy-dibenzanthrone, ethyl bromide, zinc and pyridine followed by treatment with pyridine sulphur trioxide.

10 parts of dimethoxy-dibenzanthrone, 5 parts of zinc and 25 parts of pyridine are stirred together in an atmosphere of nitrogen. The melt is heated to 35° at which temperature 0.75 part of ethyl bromide is added. The temperature is now raised to 70° and kept at 70° for 20 minutes, during which period the melt becomes blue and thicker. It is then cooled to 20° at which temperature 12 parts of pyridine sulphur trioxide are added. The melt becomes immediately crimson. The temperature is raised to 75° during 15 minutes and kept at 70–75° for half an hour. It is then worked up with sodium carbonate as described in Example 2.

*Example 6*

This deal with dimethoxy-dibenzanthrone, ethyl bromide, copper and pyridine, pyridine sulphur trioxide being added to the mixture before the metal.

5 parts of ethyl bromide, 15 parts of pyridine sulphur trioxide, 33 parts of pyridine and 10 parts of dimethoxy-dibenzanthrone are heated slowly to 70° with good stirring. 6 grams of copper powder are then slowly added so that the temperature does not exceed 75°. When all the copper has been added the temperature is maintained at 75° for 30 minutes. The melt is then poured into water containing sodium carbonate and worked up on the lines of Example 2.

Modifications may be made in the process indicated. For example, other vat dyestuffs may be used as the starting point, other metals employed in place of zinc, other bases besides pyridine and other reagents besides methyl chlor-sulphonate or others mentioned, for example ethyl chlor-sulphonate, sulphuric acid chloride or oleum or sulphur trioxide or the like.

As above indicated the reaction according to the present invention may if desired be carried out in an inert atmosphere. The inert atmosphere is not always necessary but in those cases where the intermediate product formed with the dyestuff is unstable the inert atmosphere is often of advantage.

Quaternary ammonium halides, as referred to herein, are substances such as may be obtained by reaction between a tertiary organic base and an alkyl halide.

The invention may be combined with any of the processes of the specifications referred to above or like processes.

Among the dyestuffs which may be employed according to this invention specific reference is made to:—

Indigoid and thio-indigoid dyestuffs including indigo and dichlor and dibrom indigo. Anthraquinone vat dyestuffs, including dibenzathrone, indanthrone, flavanthrone and anthraquinone acridone dyestuffs.

In general among the substances which may be dyed or printed effectively by the above process may be noted cotton, wool, natural and artificial silk and other animal or vegetable fibres.

Some of the products prepared according to the present invention are soluble in solvents other than water, for example pyridine and alcohol.

The colours may in general be developed after dyeing or printing by employment of acid oxidizing agents and in some cases alkaline oxidizing agents, for instance on the lines of British specification No. 251,491, filed on November 1st, 1924, accepted on May 3rd, 1926, and now available but not published at the priority date of the present application.

Having now described our invention, what we claim as new and desire to secure by Letters Patent is:—

1. The process for the manufacture of derivatives of vat dyestuffs which consists in reacting on a vat dyestuff with a quaternary ammonium halide, a metal, a tertiary organic base and pyridine sulphur trioxide.

2. The process for the manufacture of the derivatives of vat dyestuffs which consists in reacting on a vat dyestuff with a regent comprising a quaternary ammonium halide, a metal and a tertiary organic base and treating the product with pyridine sulphur trioxide.

3. A process for the manufacture of derivatives of vat dyestuffs comprising treating a tertiary organic base with an alkyl halide, employing the resultant product to act in tertiary organic basic suspension with a metal, a vat dyestuff and a product obtained by the interaction of a tertiary base with a reagent adapted to yield the sulphuric anhydride compound of the tertiary base.

4. A process for the manufacture of derivatives of vat dyestuffs which comprises the treatment of the vat dyestuff with a quaternary ammonium halide, a tertiary organic base and a metal, the product of the reaction then being treated with a compound of a tertiary base formed by the addition of a reagent adapted to yield the sulphuric anhydride compound of the tertiary base.

5. A process as claimed in claim 4 in which the reaction between the vat dyestuff, quaternary ammonium halide, tertiary organic base metal, and sulphuric anhydride compound of the tertiary organic base is carried out in an inert atmosphere.

6. A method as claimed in claim 4 in which the product is worked up by alkali treatment and substantial removal of the organic base.

7. A process as claimed in claim 4 in which the tertiary base employed is pyridine.

8. A process as claimed in claim 4 in which the dyestuff chosen is thio indigo.

9. A process as claimed in claim 4 in which the quaternary ammonium halide is a pyridinium alkyl halide.

10. A process as claimed in claim 4 in which the quaternary ammonium halide is ethyl pyridinium bromide.

11. A process for the production of derivatives of thio-indigo according to which 50 parts of pyridine, about 11 parts of thio-indigo and about 8 parts of zinc dust is heated to about 70° C. in an inert atmosphere, about 0.75 part of ethyl bromide is then added, the temperature is maintained at about 70° C. for about 20 minutes, the melt is then cooled to about 20° C. and about 20 parts of pyridine sulphur trioxide are added, the temperature is then raised to about 50° C. during about ½ hour and kept at about 50° C. for about ½ hour, after which the melt is mixed with about 400 parts of water containing about 30 parts of sodium carbonate and steam distilled, after which the extract is separated and the thio-indigo derivative crystallized out.

12. A thio-indigo derivative which is substantially identical with that obtainable by the process of claim 11 which is a colorless crystalline body slowly becoming pinkish on exposure to light and air, readily soluble in water and reverting to thio-indigo by the addition of acid oxidizing agents to its aqueous solution, but having little or no affinity for textile fibres, with the exception of animal fibres for which the slight affinity increases on rise of temperature.

In testimony whereof we have signed our names to this specification.

HUGH ALBERT EDWARD DRESCHER.
JOHN EDMUND GUY HARRIS.
BIRKETT WYLAM.
JOHN THOMAS.